United States Patent [19]

Kagota

[11] Patent Number: 4,475,129
[45] Date of Patent: Oct. 2, 1984

[54] NON-COPIABLE VIDEOTAPE RECORDING SYSTEM

[75] Inventor: Minoru Kagota, Tokyo, Japan

[73] Assignee: Shinano Kikaku Co., Ltd., Tokyo, Japan

[21] Appl. No.: 400,430

[22] Filed: Jul. 21, 1982

[30] Foreign Application Priority Data

Jan. 18, 1982 [JP] Japan .................................. 57-4871

[51] Int. Cl.³ .................... H04N 9/491; H04N 5/91
[52] U.S. Cl. ................................. 358/310; 358/335; 358/319; 358/120
[58] Field of Search ............... 358/310, 120, 334, 153, 358/154, 335, 319

[56] References Cited

U.S. PATENT DOCUMENTS 4,163,253  7/1979  Morio et al. ...................... 358/120
4,213,149  6/1980  Janko .............................. 358/335 X Primary Examiner—John C. Martin
Assistant Examiner—Victor Kostak
Attorney, Agent, or Firm—Koda and Androlia

[57] ABSTRACT

A non-copiable videotape recording system includes a synchro signal separator adapted to separate a horizontal and a vertical synchro signal from a synchro signal section of a video signal, a first-pulse generator adapted to generate a first pulse while the video signal is in the duration of the back porch which follows the horizontal synchro signal, wherein the first pulse has a narrower width than that of the back porch, a second-pulse generator adapted to generate a second pulse having a lower level than that of the first pulse while the video signal is in the duration of the back porch following the horizontal synchro signal, wherein the second pulse has a narrow width than that of the back porch and has a substantially equal pulse-area to that of the first pulse, and means for adding the first pulse and the second pulse alternately to the back porch of the video signal at predetermined time intervals.

6 Claims, 15 Drawing Figures

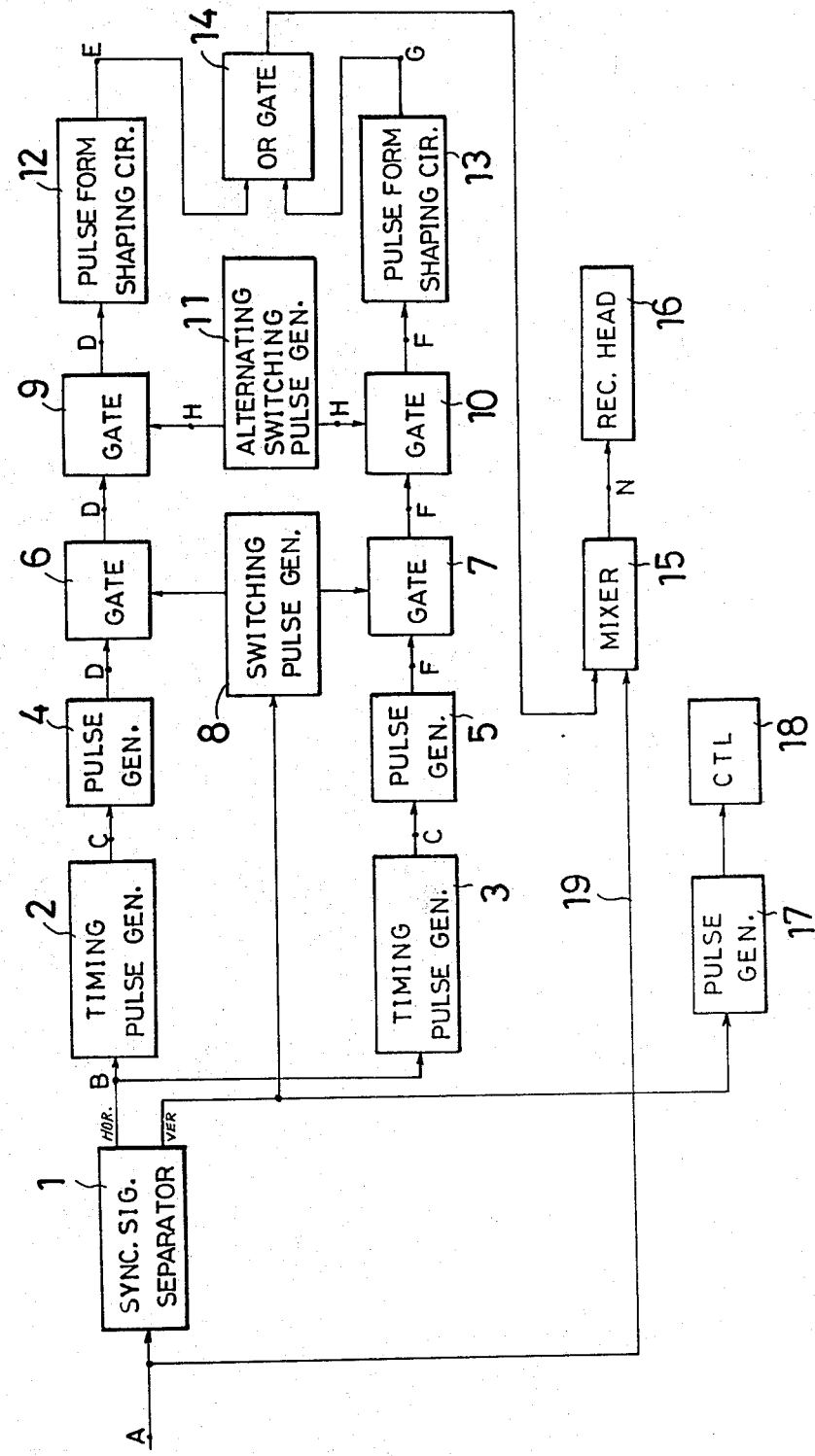

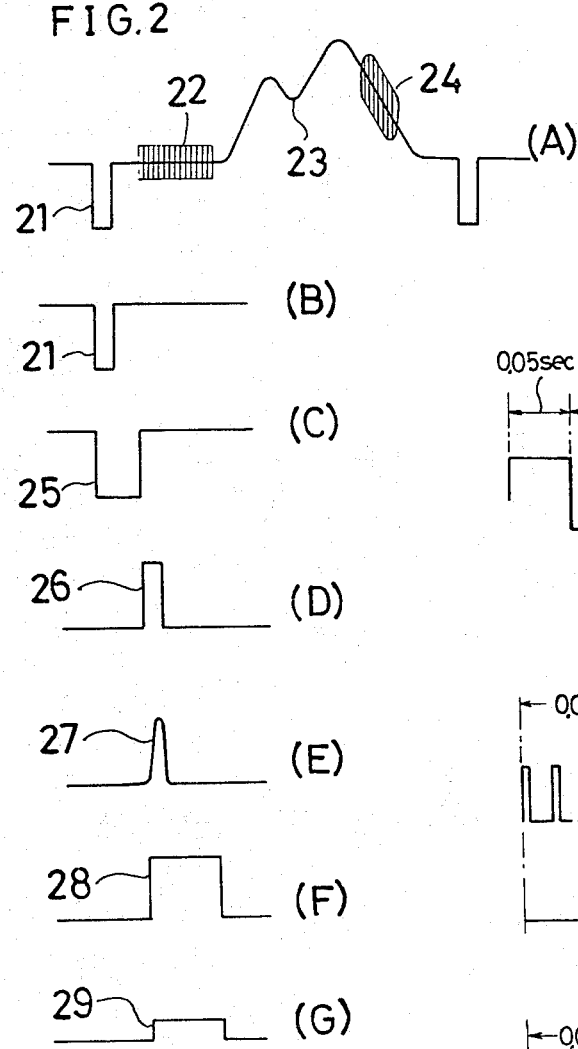

NON-COPIABLE VIDEOTAPE RECORDING SYSTEM

BACKGROUND OF THE INVENTION

1. Field of the Invention

The present invention relates to a non-copiable videotape recording system, and more particularly, to a videotape recording system capable of recording video signal on a tape such, that no copying therefrom to another tape is allowable.

2. Description of the Prior Art

To prevent an illegal copying from one videotape to another, the common practice is to utilize vertical synchro signal kept lower than a normal level when video signals are recorded on a videotape. In trying to copy from this videotape to another by means of a recorder, the synchro signal separator of the recorder cannot be properly operated because of the deliberate weakness of the vertical synchro signal. But it is no problem to reproduce the video signals on a television picture screen by increasing the low vertical synchro signal to a normal level by means of a vertical synchro signal controller incorporated in most of the television receivers.

However, the prior art system has the following disadvantages:

(1) If the synchro signal controller has a sufficient sensitivity to allow the video signals to be reproduced on another tape, the videotape is in danger of being pirated;

(2) It is troublesome to adjust the vertical synchro signal controller each time when the videotape is played back on a television set;

(3) It may happen that the video signals cannot be output because the maximum adjustable level of the vertical synchro signal does not comply with the required level; and (4) If the television set has no vertical synchro signal controller, it is absolutely impossible to play back the videotape on the television.

OBJECTS AND SUMMARY OF THE INVENTION

The present invention is directed toward solving the problems and difficulties pointed out with respect to the prior art system, and it is a principal object of the present invention to provide an improved non-copiable videotape recording system for recording video signal on a tape such that no copying therefrom to another tape is allowable.

Another object of the present invention is to provide an improved non-copiable videotape recording system which provides no difficulty in reproducing the video signals on a television picture screen.

Other objects and advantages of the present invention will become more apparent from the following description when taken in connection with the accompanying drawings which show an embodiment of the videotape recording system for the purpose of illustration only.

According to the present invention there is a videotape recording system which includes a synchro signal separator adapted to separate a horizontal and a vertical synchro signal from a synchro signal section of a video signal, a first-pulse generator adapted to generate a first pulse while the video signal is in the duration of the back porch which follows the horizontal synchro signal, wherein the first pulse has a narrower width than that of the back porch, a second-pulse generator adapted to generate a second pulse having a lower level than that of the first pulse while the video signal is in the duration of the back porch following the horizontal synchro signal, wherein the second pulse has a narrow width than that of the back porch and has a substantially equal pulse-area to that of the first pulse, and means for adding the first pulse and the second pulse alternately to the back porch of the video signal at predetermined time intervals.

BRIEF DESCRIPTION OF THE DRAWINGS

FIG. 1 shows a block diagram showing an embodiment of the present invention;

FIG. 2(A) shows an example of the NTSC color video signals in a schematic form;

FIGS. 2(B), (C), (D), (E), (F) and (G) each shows a pulse wave form output from the component circuits of the embodiment of FIG. 1, particularly showing their relationships with time;

FIG. 3 shows an alternating switching pulse for gating the gates in FIG. 1.

FIGS. 4(D) and (F) show pulse trains output from the gates in FIG. 1;

FIGS. 5(E) and (G) show pulse trains output from the pulse-form shaping circuits in FIG. 1;

DETAILED DESCRIPTION OF THE INVENTION

Figure 6:
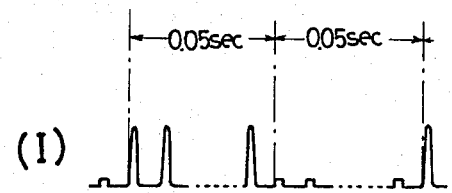
FIG. 6 shows a pulse train output from the OR-gate 14 in FIG. 1.
Figure 7:
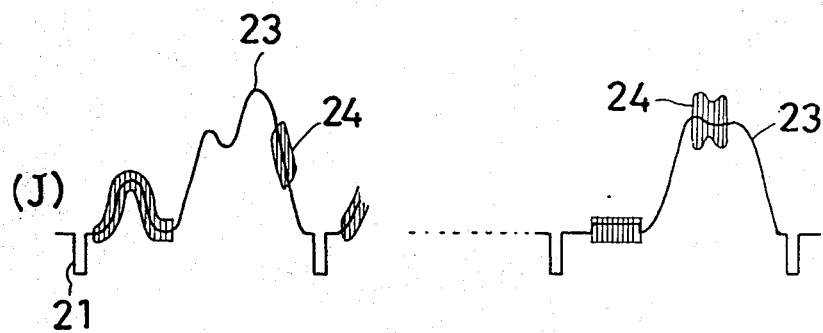
FIG. 7 shows color video signals with the pulse train of FIG. 3 added thereon.

Referring to FIG. 1 the reference numeral 1 designates a synchro signal separator adapted to separate a horizontal synchro signal and a vertical synchro signal from an NTSC color video signal input thereto. The NTSC color video Signal shown in FIG. 2(A) consists of a horizontal synchro signal 21, a color burst signal 22 and a luminance signal 23 with a chrome signal 24 superposed thereon. The horizontal synchro signal 21 output by the synchro signal separator 1 is applied to two separate paths; one path leading to a timing pulse generator 2 and the other leading to a further timing pulse generator 3, each of which generates a timing pulse 25 of the same form synchronously with the horizontal synchro signal 21. As will be appreciated from FIG. 2(C), the timing pulse 25 has a sufficient width to reach the leading edge of the color burst signal 22. Triggered by the timing pulse 25 the pulse generators 4 and 5 generate a pulse 26 shown in FIG. 2(D) and a pulse 28 shown in FIG. 2(F), respectively. The pulse 26 has a wider width than the period of the frequency of the color burst signal 22, while the width of the pulse 28 covers the whole range of the color burst signal 22. These pulses 26 and 28 are then gated at their respective gate circuits 6 and 7 so as not to proceed when a vertical synchro signal is contained in a series of video signals, the gate circuits 5 and 7 being driven with switching pulses output from a switching pulse generator 8, which generates the switching pulse synchronously with a vertical synchro signal accompanying the video signal. The pulses 26 and 28, which have passed through the respective gate circuits 6 and 7, proceed further to subsequent gate circuits 9 and 10, respectively. The gate circuits 9 and 10, driven by an alternating switching-pulse generator 11, switch the pulses 26 and 28 alternately at predetermined time intervals of 0.05 seconds, so that the pulses 26 and 28 are applied to their respective pulse-form shaping circuits 12 and 13 alternately at the time intervals of 0.05 seconds. The pulse-form shaping circuit 12 blunts the form of the pulse 26 as shown by the reference numeral 27 in FIG. 2(E), while the pulse-form shaping circuit 13 equalizes the pulse-area of the pulse 28 to that of the blunted pulse 27. These two kinds of pulses are then united at an OR-gate circuit 14. As a result the OR-gate circuit 14 outputs a pulse train as shown in FIG. 6. This pulse train is mixed at a mixer 15 with a series of NTSC color video signals led thereto through a separate route 19. Because each component of the pulse train, coincides with each color burst signal in the color video signals, the mixer 15 outputs a series of color video signals whose color burst signals are modified as shown in FIG. 7. These modified color video signals are finally recorded on a videotape through a recording head 16. The vertical synchro signal from the synchro signal separator 1 is used to drive a pulse generator 17. The output from the pulse generator 17 is recorded on the videotape through a CTL head 18.

Once color video signals have been recorded on a videotape in this way, it is no longer possible to copy the video signals to another tape by means of a conventional color video recorder because of the existence of the signals 27 and 29 added to the color burst signals which work to impair the function of the AGC circuit in the videotape recorder. However, it is no problem to reproduce the color video signals on a television picture screen because these signals 27 and 29 are filtered off at and by a chroma signal filter in the television set.

The time intervals at which the pulse signals 27 and 29 are alternately switched are not restricted to 0.05 seconds, but a suitable interval can be selected between 1000 seconds and a time corresponding to one horizontal scanning.

FIG. 5 shows a slightly modified version of the embodiment in which the timing pulse generator 3 is not used and in which the output from the timing pulse generator 2 is applied to both the pulse generators 4 and 5.

It is of course possible to apply the present invention to a monochromatic video signal wherein the video signal is not accompanied by a color burst signal.

What is claimed is:

1. A non-copiable videotape recording system comprising:

a synchro signal separator for separating a horizontal synchro signal and a vertical synchro signal from a synchro signal section of a video signal;

a first-pulse generator for generating a first pulse at a given time while said video signal is during the back porch succeeding said horizontal synchro signal, said first pulse having a narrower width than that of said back porch;

a second-pulse generator for generating a second pulse with a lower level than that of said first pulse at a given time while said video signal is during said back porch, said second pulse having a narrower width than that of said back porch and a substantially equal pulse-area to that of said first pulse; and means for adding said first and second pulses alternately to said back porch of said video signal at the back porch thereof at predetermined time intervals.

2. A non-copiable videotape recording system comprising:

a synchro signal separator for separating a horizontal synchro signal and a vertical synchro signal from a synchro signal section of a color video signal;

a first-pulse generator for generating a first pulse at a given time while the color burst signal succeeding said horizontal synchro signal, said first pulse having a width unequal to the period of the frequency of said color burst signal;

a second-pulse generator for generating a second pulse with a lower level than that of said first signal during said color burst signal, said second pulse having a substantially equal pulse-area to that of said first pulse and having a width not reaching the leading edge of the luminance signal section of said color video signal; and means for adding said first and second pulses alternately to said color burst signal at predetermined time intervals.

3. A non-copiable videotape recording system as defined in claim 2, wherein said first pulse is generated synchronously with the leading edge of said color burst signal.

4. A non-copiable videotape recording system as defined in claim 2, wherein said second pulse covers the whole range of said color burst signal.

5. A non-copiable videotape recording system as defined in claim 3, wherein said second pulse covers the whole range of said color burst signals.

6. A non-copiable videotape recording system as defined in claim 2, 3, 4 or 5, wherein said time intervals are between 1000 seconds and the period of time required for one horizontal scanning.

* * * * *